US 8,224,761 B1
Jul. 17, 2012

(54) SYSTEM AND METHOD FOR INTERACTIVE CORRELATION RULE DESIGN IN A NETWORK SECURITY SYSTEM

(75) Inventor: Troy Dean Rockwood, Thousand Oaks, CA (US)

(73) Assignee: Raytheon Company, Waltham, MA (US)

(*) Notice: Subject to any disclaimer, the term of this patent is extended or adjusted under 35 U.S.C. 154(b) by 653 days.

(21) Appl. No.: 11/219,025

(22) Filed: Sep. 1, 2005

(51) Int. Cl.
*G06F 17/00* (2006.01)
*G06F 15/173* (2006.01)
*G06N 5/02* (2006.01)

(52) U.S. Cl. .......... 706/47; 709/224

(58) Field of Classification Search .......... 706/47, 706/911; 714/26; 709/223, 224; 716/26
See application file for complete search history.

(56) References Cited

U.S. PATENT DOCUMENTS

| | | | |
|---|---|---|---|
| 5,020,411 A | 6/1991 | Rowan | 89/1.11 |
| 5,341,229 A | 8/1994 | Rowan | 359/10 |
| 5,432,871 A | 7/1995 | Novik | 382/232 |
| 5,790,599 A | 8/1998 | Wright, Jr. et al. | 375/240 |
| 5,805,801 A * | 9/1998 | Holloway et al. | 726/22 |
| 5,991,881 A | 11/1999 | Conklin et al. | 726/22 |
| 6,088,804 A | 7/2000 | Hill et al. | |
| 6,226,589 B1 | 5/2001 | Maeda et al. | 701/207 |
| 6,253,337 B1 | 6/2001 | Maloney et al. | 714/38 |
| 6,327,550 B1 | 12/2001 | Vinberg et al. | 702/186 |
| 6,341,298 B1 | 1/2002 | Ilani | 708/520 |
| 6,347,263 B1 | 2/2002 | Johnson et al. | 701/14 |
| 6,404,380 B2 | 6/2002 | Poore, Jr. | 342/96 |
| 6,408,297 B1 | 6/2002 | Ohashi | 707/10 |
| 6,421,467 B1 | 7/2002 | Mitra | 382/240 |
| 6,574,378 B1 | 6/2003 | Lim | 382/305 |
| 6,633,882 B1 | 10/2003 | Fayyad et al. | 707/101 |
| 6,650,779 B2 | 11/2003 | Vachtesvanos et al. | 382/228 |
| 6,665,715 B1 | 12/2003 | Houri | 709/223 |
| 6,674,911 B1 | 1/2004 | Pearlman et al. | 382/240 |
| 6,744,396 B2 | 6/2004 | Stone et al. | 342/36 |
| 6,954,775 B1 | 10/2005 | Shanklin et al. | 718/105 |
| 7,017,186 B2 | 3/2006 | Day | 726/23 |
| 7,058,976 B1 | 6/2006 | Dark | 726/23 |
| 7,100,204 B1 | 8/2006 | Myllymaki et al. | 726/22 |
| 7,127,743 B1 | 10/2006 | Khanolkar et al. | 726/23 |
| 7,130,611 B2 | 10/2006 | Kimura et al. | 455/404.2 |
| 7,146,421 B2 | 12/2006 | Syvanne | 709/226 |
| 7,185,368 B2 | 2/2007 | Copeland, III | 726/25 |
| 7,251,376 B2 | 7/2007 | Qian et al. | 382/253 |

(Continued)

OTHER PUBLICATIONS

W. Jansen et al., Mobile Agents in Intrusion Detection and Response, 2000, 12th Annual Canadian Information Technology Security Symposium, 1-11.*

(Continued)

*Primary Examiner* — Jeffrey A Gaffin
*Assistant Examiner* — Benjamin Buss
(74) *Attorney, Agent, or Firm* — Schwegman, Lundberg & Woessner, P.A.

(57) ABSTRACT

A method for generating correlation rules for events comprises receiving event data for each of a plurality of events, the event data of a particular event comprising at least one attribute associated with that event. The method continues by displaying the event data for each of the plurality of events to an operator. The method continues by receiving a selection of at least a portion of the events. The method continues by generating at least one rule that correlates the selected events based at least in part upon the attributes associated with the selected events. The method concludes by displaying the event data to the operator in accordance with the at least one rule.

33 Claims, 4 Drawing Sheets

U.S. PATENT DOCUMENTS

| | | | |
|---|---|---|---|
| 7,324,108 B2 | 1/2008 | Hild et al. | 345/440 |
| 7,370,358 B2 | 5/2008 | Ghanea-Hercock | 726/23 |
| 2002/0059164 A1 | 5/2002 | Shtivelman | 707/1 |
| 2002/0078381 A1 | 6/2002 | Farley et al. | 713/201 |
| 2002/0112189 A1 | 8/2002 | Syvanne et al. | 713/201 |
| 2002/0165842 A1* | 11/2002 | Hellerstein et al. | 706/47 |
| 2002/0188618 A1 | 12/2002 | Ma et al. | |
| 2003/0009699 A1 | 1/2003 | Gupta et al. | 713/201 |
| 2003/0023876 A1* | 1/2003 | Bardsley et al. | 713/201 |
| 2003/0058339 A1 | 3/2003 | Trajkovic et al. | 348/155 |
| 2003/0105976 A1 | 6/2003 | Copeland, III | 713/201 |
| 2003/0145226 A1 | 7/2003 | Bruton et al. | 726/22 |
| 2003/0154399 A1 | 8/2003 | Zuk et al. | 726/11 |
| 2003/0177383 A1 | 9/2003 | Ofek et al. | 726/14 |
| 2003/0188189 A1 | 10/2003 | Desai et al. | 713/201 |
| 2003/0200236 A1 | 10/2003 | Hong | 708/200 |
| 2003/0217289 A1 | 11/2003 | Ammon et al. | 713/201 |
| 2004/0015719 A1 | 1/2004 | Lee et al. | 726/23 |
| 2004/0024855 A1 | 2/2004 | Tsai et al. | 709/223 |
| 2004/0025044 A1 | 2/2004 | Day | 713/200 |
| 2004/0044912 A1 | 3/2004 | Connary et al. | 713/201 |
| 2004/0049698 A1 | 3/2004 | Ott et al. | 713/201 |
| 2004/0098623 A1 | 5/2004 | Scheidell | 713/201 |
| 2004/0103211 A1 | 5/2004 | Jackson et al. | 709/244 |
| 2004/0107125 A1* | 6/2004 | Guheen et al. | 705/7 |
| 2004/0117407 A1 | 6/2004 | Kumar et al. | 707/200 |
| 2004/0117654 A1 | 6/2004 | Feldman et al. | 713/201 |
| 2004/0133543 A1 | 7/2004 | Shlaes et al. | 707/1 |
| 2004/0172557 A1* | 9/2004 | Nakae et al. | 713/201 |
| 2004/0193943 A1* | 9/2004 | Angelino et al. | 714/4 |
| 2004/0215977 A1 | 10/2004 | Goodman et al. | 713/201 |
| 2004/0260945 A1 | 12/2004 | Raikar et al. | 713/201 |
| 2004/0261116 A1* | 12/2004 | Mckeown et al. | 725/109 |
| 2004/0267886 A1 | 12/2004 | Malik | 709/206 |
| 2005/0035965 A1 | 2/2005 | Sloan et al. | 345/426 |
| 2005/0044406 A1 | 2/2005 | Stute | 713/201 |
| 2005/0047670 A1 | 3/2005 | Qian et al. | 382/253 |
| 2005/0108518 A1* | 5/2005 | Pandya | 713/151 |
| 2005/0138110 A1* | 6/2005 | Redlich et al. | 709/201 |
| 2005/0222996 A1 | 10/2005 | Yalamanchi | 707/4 |
| 2005/0254654 A1* | 11/2005 | Rockwell et al. | 380/270 |
| 2006/0010493 A1* | 1/2006 | Piesco et al. | 726/23 |
| 2006/0031934 A1 | 2/2006 | Kriegel | 726/22 |
| 2006/0130070 A1* | 6/2006 | Graf | 719/318 |
| 2006/0209836 A1 | 9/2006 | Ke et al. | 370/392 |
| 2006/0253905 A1 | 11/2006 | Mansel | 726/23 |
| 2006/0253907 A1 | 11/2006 | McConnell | 726/23 |
| 2007/0009160 A1 | 1/2007 | Loo et al. | 382/225 |

OTHER PUBLICATIONS

Feiyi Wang et al., SITAR: A Scalable Intrusion-Tolerant Architecture for Distributed Services, 2001, IEEE, 38-45.*
Rebecca Bace et al., Intrusion Detection Systems, Feb. 2001, NIST, 1-51.*
Henry S. Teng et al., Security Audit Trail analysis Using Inductively Generated Predictive Rules, 1990, IEEE, CH2842-3/90/0000/0024, 24-29.*
No author, IEEE Explore# Search Result, Jan. 6, 2009, 1-4.*
Ning,P. et al. "Techniques and Tools for Analyzing Alerts" ACM Transactions on Information and System Security, vol. 7, No. 2, May 2004.*
Li et al., "Multi-Tier Intrusion Detection System," pp. 1-11.
Commonwealth of Australia, "Handbook 13, Intrusion Detection and Audit Analysis, v. 1.0," Australian Communications-Electronic Security Instruction 33 (ACSI 33), pp. 13:1-13.
Wu et al., "JiNao: Design and Implementation of a Scalable Intrusion Detection System for the OSPF Routing Protocol," pp. 0-23, Feb. 24, 1999.
Dasgupta; "Experiments with Random Projection," Proc. 16th Conference Uncertainty in Artificial Intelligence (UAI), 9 pages, 2000.
Cisco Systems, Inc., "NetRanger User Guide 2.2.1," Chapters 1-9 and Appendices A-C, 2000.
Jou et al., "Design and Implementation of a Scalable Intrusion Detection System for the Protection of Network Infrastructure," DARPA Information Survivability Conference and Exposition (DISCEX), 15 pages, Jan. 2000.
Boeckman, "Getting Closer to Policy-Based Intrusion Detection," Information Security Bulletin, pp. 13-20, May 2000.
Jansen et al., "Mobile Agents in Intrusion Detection and Response," National Institute for Standards and Technology, 12 pages, Jun. 2000.
Northcutt et al., "Network Intrusion Detection: An Analyst's Handbook," $2^{nd}$ Ed., 19 pages, Sep. 2000.
Phung, "Intrusion Detection FAQ; Data Mining in Intrusion Detection," SANS.org, 3 pages, Oct. 24, 2000.
Power, "CSI Roundtable: Experts Discuss Present and Future Intrusion Detection Systems," Computer Security Journal vol. XIV, #1, 15 pages, 2001.
Bace et al., "Intrusion Detection Systems," NIST Special Publication on Intrusion Detection System, 51 pages, Feb. 2001.
"Stick—A Potential Denial of Service Against IDS Systems," Internet Security Systems Security Alert, 2 pages, Mar. 14, 2001.
Arnold, "Kernel Based Anomaly Detection," Intrusion Detection Systems, Machine Learning Group, Columbia University, 2 pages, Apr. 26, 2001.
Wang et al., "SITAR: A Scalable Intrusion-Tolerant Architecture for Distributed Services," IEEE Workshop on Information Assurance and Security, pp. 38-45, Jun. 5-6, 2001.
Intrusion.com, Inc., "Network Intrusion Detection System," SecureNet Series, 6 pages, Jul. 2001.
Raghudharan, "Intrusion Detection Systems: Beyond the first line of defense," Network Magazine, 7 pages, Sep. 2001.
Yocom et al., "Intrusion Detection Products Grow Up," Network World, pp. 1-10/12, Oct. 8, 2001.
Symantec, "Symantec™ ManHunt: Reducing the Risk of Compromise," Enterprise Security Technology, 4 pages, 2002.
ISS Corporation, "ISS RealSecure © Protection System," 5 pages, Apr. 1, 2003.
Curry et al., "Intrusion Detection Message Exchange Format Data Model and Extensible Markup Language (XML) Document Type Defmition," Intrusion Detection Working Group, 116 pages, Jan. 30, 2003.
Jiang et al., "Compressing N-Dimensional Data", U.S. Appl. No. 11/559,786, 31 pages, 3 pages of drawings, filed Nov. 14, 2006.
Gersho et al., "Vector Quantization and Signal Compression," Kluwar Academic Publishers, 737 pages, 1992.
U.S. Appl. No. 10/407,513, entitled "*Vertically Extensible Intrusion Detection System and Method*", inventors Jon-Michael C. Brook, et al., 44 pages plus 7 pages of drawings, filed Apr. 4, 2003.
U.S. Appl. No. 10/407,700, entitled "*Dynamic Rule Generation for an Enterprise Intrusion Detection System*", inventors Jon-Michael C. Brook, et al., 38 pages plus 7 pages of drawings, filed Apr. 4, 2003.
U.S. Appl. No. 10/407,030, entitled "*Graphical User Interface for an Enterprise Intrusion Detection System*", inventors Jon-Michael C. Brook, et al., 34 pages plus 7 pages of drawings, filed Apr. 4, 2003.
Patent Pending Application U.S. Appl. No. 11/176,436, entitled "*System and Method for Active Data Collection in a Network Security System*", inventor Troy D. Rockwood, 23 pages plus 2 pages of drawings, filed Jul. 6, 2005.
New Patent Application U.S. Appl. No. 11/219,291, entitled *System and Method for Collaborative Information Security Correlation in Low Bandwidth Environments*, inventor Troy D. Rockwood, 44 pages plus 7 pages of drawings, filed Sep. 1, 2005.
New Patent Application U.S. Appl. No. 11/219,595, entitled "*System and Method for Intruder Tracking Using Advanced Correlation in a Network Security System*", inventor Troy D. Rockwood, 43 pages plus 7 pages of drawings, filed Sep. 1, 2005.
Sheng Ma, et al.; *Event Miner: An Integrated Mining Tool for Scalable Analysis of Event Data*; 17 pages, May 21, 2001.
USPTO; Office Action for U.S. Appl. No. 11/219,291, filed Sep. 1, 2005 in the name of Troy Dean Rockwood; 33 pages, Dec. 11, 2008.
USPTO; Office Action for U.S. Appl. No. 11/176,436, filed Jul. 6, 2005 in the name of Troy Dean Rockwood; 29 pages, Feb. 10, 2009.
N. Hari Narayanan, et al.; *A Methodology for Knowledge Acquisition and Reasoning in Failure Analysis of Systems*; IEEE Transactions on Systems, Man, and Cybernetics; vol. SMC-17, No. 2; pp. 274-288, 1987.
Henry S. Vaccaro; *Detection of Anomalous Computer Session Activity*; IEEE Symposium on Research in Security and Privacy; 24 pages, May 1989.

Henry S. Teng, et al.; *Adaptive Real-Time Anomaly Detection Using Inductively Generated Sequential Patterns*; IEEE; CH2884-5/90/0000/0278; pp. 278-284, 1990.

Keith C. C. Chan, et al.; *Learning Sequential Patterns for Probabilistic Inductive Prediction*; IEEE Transactions on Systems, Man, and Cybernetics; vol. 24, No. 10; 16 pages, Oct. 1994.

F. Girault, et al.; *Linear Logic as a Tool for Reasoning on a Petri Net Model*; IEEE Symposium on Emerging Technologies and Factory Automation; 11 pages, Oct. 1995.

P. Nassery, et al.; *Real Time Seismic Signal Processing Using the ARMA Model Coefficients and an Intelligent Monitoring System*; IEEE TENCON—Speech and Image Technologies for Computing and Telecommunications; pp. 807-810, 1997.

Moataz A. Ahmed, et al.; *Rule-Based Information Distribution Systems: Near-Optimal Rule Sets Generation*; IEEE; 0-7803-4778-1; pp. 1564-1569, 1998.

P. Lang, et al.; *A Graphical Editor for the Conceptual Design of Business Rules*; 1 page, Feb. 1998.

Alistair G. Sutcliffe, et al.; *Supporting Scenario-Based Requirements Engineering*; IEEE Transactions on Software Engineering; vol. 24, No. 12; pp. 1072-1088, Dec. 1998.

Adrian K. Rantilla, et al.; *Aggregation of Expert Opinions*; Proceedings of the 32nd Hawaii International Conference on System Sciences; IEEE 0-7695-0001-3/99; pp. 1-11, 1999.

Slavica Jonic, et al.; *Three Machine Learning Techniques for Automatic Determination of Rules to Control Locomotion*; IEEE Transactions on Biomedical Engineering; vol. 46, No. 3; pp. 300-310, Mar. 1999.

Ian Ho, et al.; *Generating Test Cases for Real-Time Software by Time Petri Nets Model*; Proceedings Eighth Asian Test Symposium; 7 pages, Nov. 1999.

Virtyt Koshi; *Radio Network Planning for Ultra TDD Systems*; First International Conference on 3G Mobile Communication Technologies; 7 pages, Mar. 2000.

Ilham Benyahia, et al.; *An Adaptive Framework for Distributed Complex Applications Development*; Proceedings 34th International Conference on Technology of Object-Oriented Languages and Systems; 12 pages, Jul. 2000.

Tae-Sic Yoo, et al.; *New Results on Decentralized Supervisory Control of Discrete-Event Systems*; 6 pages, Dec. 2000.

Ping-Peng Yuan, et al.; *An Event and Service Interacting Model and Event Detection Based on the Broker/Service Model*; pp. 20-24, Jul. 2001.

W. E. Brown, et al.; *Estimation of Ocean Bottom Scattering Strength Using Discrete Eigenray Matching in Shallow Water*; MTS 0-933-957-28-9; pp. 1636-1639, Nov. 2001.

XiaoShu Hang, et al.; *A FSA-Based Approach for Mining Sequential Patterns with User-Specified Skeletons*; Proceedings of the 4th World Congress on Intelligent Control and Automation; 6 pages, Jun. 2002.

Azizi Ab Aziz, et al.; *Development of an Adaptive Business Insolvency Classifier Prototype (AVICENA) Using Hybrid Intelligent Algorithms*; Proceedings Globalizing Research and Development in Electrical and Electronics Engineering; 5 pages, Jul. 2002.

Loganathan Lingappan, et al.; *Test Generation for Non-Separable RTL Controller-Datapath Circuits Using a Satisfiability Based Approach*; Proceedings of the 21st International Conference on Computer Design; 7 pages, 2003.

F. Y. Nakamoto, et al.; *Systematization of the Project of the Production System Control*; IEEE International Symposium on Industrial Electronics; 8 pages, Jun. 2003.

Nicholas Pioch, et al.; *CADRE: Continuous Analysis and Discovery From Relational Evidence*; International Conference on Integration of Knowledge Intensive Multi-Agent Systems; 9 pages, Sep. 2003.

Andrew Hamilton-Wright, et al.; *Constructing a Fuzzy Rule Based Classification System Using Pattern Discovery*; NAFIPS 2005—2005 Annual Meeting of the North American Fuzzy Information Processing Society; pp. 460-465, 2005.

USPTO; Office Action for U.S. Appl. No. 10/407,700, filed Apr. 4, 2003 in the name of Jon-Michael C. Brook; 10 pages, Aug. 9, 2006.

USPTO; Office Action for U.S. Appl. No. 10/407,030, filed Apr. 4, 2003 in the name of Jon-Michael C. Brook; 9 pages, Jan. 8, 2007.

USPTO; Office Action for U.S. Appl. No. 10/407,513, filed Apr. 4, 2003 in the name of Jon-Michael C. Brook; 12 pages, Mar. 27, 2007.

USPTO; Office Action for U.S. Appl. No. 10/407,700, filed Apr. 4, 2003 in the name of Jon-Michael C. Brook; 9 pages, Apr. 19, 2007.

USPTO; Office Action for U.S. Appl. No. 11/219,595, filed Sep. 1, 2005 in the name of Troy Dean Rockwood; 17 pages, Jun. 7, 2007.

USPTO; Advisory Action for U.S. Appl. No. 10/407,700, filed Apr. 4, 2003 in the name of Jon-Michael C. Brook; 3 pages, Jul. 6, 2007.

USPTO; Notice of Allowance and Fee (s) Due for U.S. Appl. No. 10/407,030, filed Apr. 4, 2003 in the name of Jon-Michael C. Brook; 15 pages, Aug. 24, 2007.

USPTO; Notice of Allowance and Fee (s) Due for U.S. Appl. No. 10/407,513, filed Apr. 4, 2003 in the name of Jon-Michael C. Brook; 17 pages, Nov. 6, 2007.

USPTO; Notice of Allowance and Fee (s) Due for U.S. Appl. No. 11/219,595, filed Sep. 1, 2005 in the name of Troy Dean Rockwood; 6 pages, Nov. 7, 2007.

USPTO; Office Action for U.S. Appl. No. 10/407,700, filed Apr. 4, 2003 in the name of Jon-Michael C. Brook; 7 pages, Apr. 17, 2009.

USPTO; Office Action for U.S. Appl. No. 11/219,291, filed Sep. 1, 2005 in the name of Troy Dean Rockwood; 36 pages, May 20, 2009.

Patent Pending U.S. Appl. No. 11/328,689 entitled *System and Method for Attacker Attribution in a Network Security System* in the name of Troy Dean Rockwood; 51 total pages, filed Jan. 10, 2006.

USPTO; Office Action for U.S. Appl. No. 11/328,689, filed Jan. 10, 2006 in the name of Troy Dean Rockwood; 18 pages, Mar. 19, 2009.

USPTO; Office Action for U.S. Appl. No. 11/176,436, filed Jul. 6, 2005 in the name of Troy Dean Rockwood; 23 pages, Aug. 7, 2009.

USPTO; Office Action for U.S. Appl. No. 11/559,786, filed Nov. 14, 2006 in the name of Qin Jiang; 18 pages, Aug. 10, 2009.

USPTO; Office Action for U.S. Appl. No. 11/328,689, filed Jan. 10, 2006 in the name of Troy Dean Rockwood; 17 pages, Sep. 10, 2009.

USPTO; Office Action for U.S. Appl. No. 11/219,291, filed Sep. 1, 2005 in the name of Troy Dean Rockwood; 34 pages, Notification Date Dec. 11, 2009.

Noel et al., "Correlating Intrusion Events and Building Attack Scenarios Through Attack Graph Distances", 2004, Computer Security Applications Conferences, 2004, 20th Annual, pp. 1-5, 2004.

USPTO; Office Action for U.S. Appl. No. 11/176,436, filed Jul. 6, 2005 in the name of Troy Dean Rockwood; 20 pages, Notification Date Dec. 24, 2009.

USPTO; Office Action for U.S. Appl. No. 10/407,700, filed Apr. 4, 2003 in the name of Joh-Michael Brook; 4 pages, Notification Date Oct. 16, 2009.

USPTO; Office Action for U.S. Appl. No. 11/559,786, filed Nov. 14, 2006 in the name of Qin Jiang; 22 pages, Notification Date Jan. 22, 2010.

USPTO; Office Action for U.S. Appl. No. 11/328,689, filed Jan. 10, 2006 in the name of Troy Dean Rockwood; 25 pages, Notification Date Feb. 22, 2010.

Liu et al., "*Incremental Maintenance of Nested Relational Views*", Database Engineering and Applications, 1999, International Symposium Proceedings Aug. 2-4, 1999; pp. 197-205.

USPTO; Office Action for U.S. Appl. No. 10/407,700, filed Apr. 4, 2003 in the name of Jon-Michael C. Brook; 5 pages, Notification Date Apr. 14, 2010.

USPTO; Office Action for U.S. Appl. No. 11/176,436, filed Jul. 6, 2005 in the name of Troy Dean Rockwood; 20 pages; Jun. 3, 2010.

USPTO; Office Action, U.S. Appl. No. 11/219,291, filed Sep. 1, 2005 in the name of Troy Dean Rockwood; 36 pages, Jun. 24, 2010.

USPTO; Advisory Action, U.S. Appl. No. 11/328,689, filed Jan. 10, 2006 in the name of Troy Dean Rockwood; 2 pages, Nov. 30, 2009.

USPTO; Office Action, U.S. Appl. No. 11/219,291, filed Sep. 1, 2005 in the name of Troy Dean Rockwood; 33 pages, Sep. 14, 2010.

USPTO; Notice of Allowance and Fee(s) Due, U.S. Appl. No. 10/407,700, filed Apr. 4, 2003, Inventor Jon-Michael C. Brook; 9 pages, Oct. 19, 2010.

Rockwood, "Response Pursuant to 37 C.F.R. §1.111," U.S. Appl. No. 11/176,436, 12 pages, filed with USPTO May 11, 2009.

Rockwood, "Response Pursuant to 37 C.F.R. §1.111," U.S. Appl. No. 11/328,689, 15 pages, filed with USPTO Jun. 19, 2009.

Rockwood, "Response Pursuant to 37 C.F.R. §1.111," U.S. Appl. No. 11/219,291, 14 pages, filed with USPTO Aug. 20, 2009.

Rockwood, "Response Pursuant to 37 C.F.R. §1.116," U.S. Appl. No. 11/176,436, 11 pages, filed with USPTO Oct. 7, 2009.

Rockwood, "Response Pursuant to 37 C.F.R. §1.116," U.S. Appl. No. 11/328,689, 15 pages, filed with USPTO Nov. 9, 2009.
Rockwood, "Response Pursuant to 37 C.F.R. §1.111," U.S. Appl. No. 11/219,291, 13 pages, filed with USPTO Mar. 11, 2010.
Rockwood, "Response Pursuant to 37 C.F.R. §1.111," U.S. Appl. No. 11/176,436, 13 pages, filed with USPTO Mar. 24, 2010.
Rockwood, "Response Pursuant to 37 C.F.R. §1.111," U.S. Appl. No. 11/328,689, 17 pages, filed with USPTO, May 24, 2010.
Brook et al., "Response Pursuant to 37 C.F.R. §1.111," U.S. Appl. No. 10/407,700, 12 pages, filed with USPTO, Jul. 14, 2010.
Brook et al., "Response Pursuant to 37 C.F.R. §1.111," U.S. Appl. No. 10/407,700, 3 pages, filed with USPTO, Jan. 19, 2010.
Rockwood, "Response Pursuant to 37 C.F.R. §1.111," U.S. Appl. No. 11/559,786, 13 pages, filed with USPTO, Apr. 22, 2010.
Rockwood, "Response Pursuant to 37 C.F.R. §1.111," U.S. Appl. No. 11/559,786, 12 pages, filed with USPTO, Nov. 10, 2009.
Rockwood, "Response Pursuant to 37 C.F.R. §1.116," U.S. Appl. No. 11/219,291, 15 pages, filed with USPTO, Aug. 24, 2010.
USPTO; Notice of Allowance and Fee(s) Due; U.S. Appl. No. 11/219,291, filed Sep. 1, 2005, Troy Dean Rockwood; (9 pages), date mailed Jan. 13, 2011.
USPTO; Office Action, U.S. Appl. No. 11/176,436, filed Jul. 6, 2005, Troy Dean Rockwood; (29 pages), notification date Feb. 17, 2011.

* cited by examiner

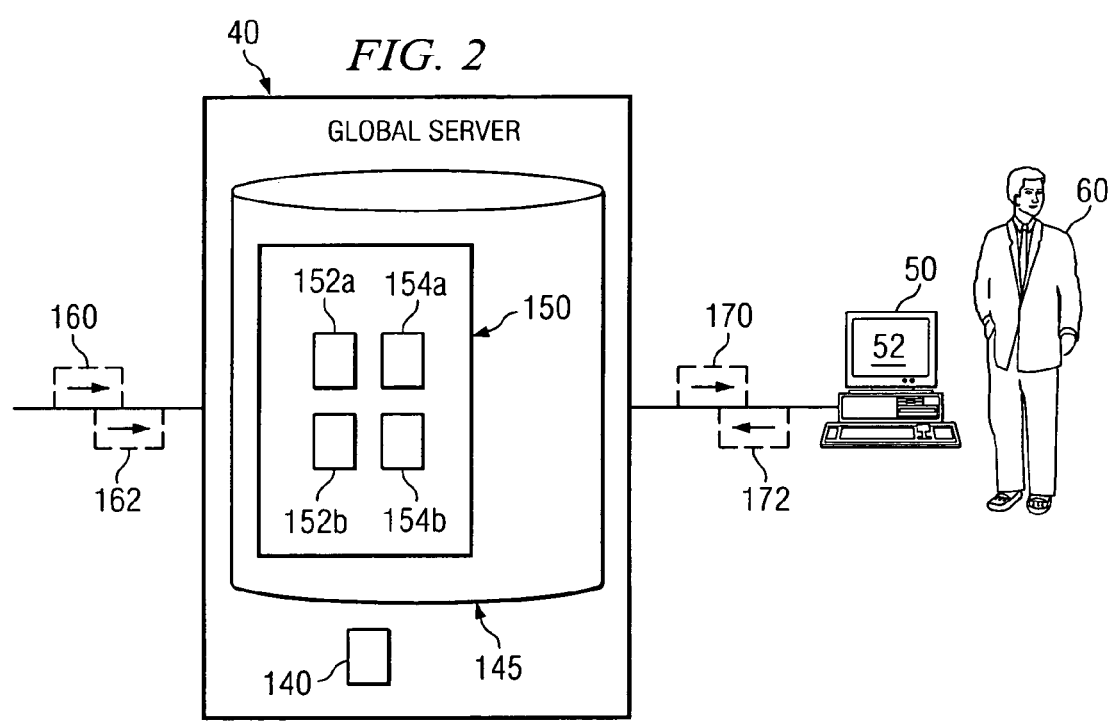

US 8,224,761 B1

SYSTEM AND METHOD FOR INTERACTIVE CORRELATION RULE DESIGN IN A NETWORK SECURITY SYSTEM

TECHNICAL FIELD OF THE INVENTION

This invention relates to intrusion detection systems and, more specifically, to a system and method for interactive correlation rule design in a network security system.

BACKGROUND OF THE INVENTION

Intrusion detection systems are used by an enterprise to detect and identify unauthorized or unwanted use (commonly called an attack) of the enterprise's computer network, which normally comprises a large number of nodes and network operations centers. In general, these enterprise intrusion detection systems detect events using sensors or other intrusion detection devices. The system then scans the incoming event data according to rules designed to detect specific patterns in network traffic, audit trails, and other data sources to detect malicious activity. The event data is normally displayed on an event display interface that allows an operator to apply filters to modify the level of data displayed. The event data interface, however, does not allow the operator to create new rules for correlating events. The creation of new rules must typically be done at a separate interface—the correlation rule design interface. This second interface requires the operator to first design the rule and then test the rule against a replay of old data. This trial and error method of rule building typically requires the operator to have a technical understanding of the underlying rule structure.

SUMMARY OF THE INVENTION

In accordance with the present invention, the disadvantages and problems associated with traditional rule design for intrusion detection systems have been substantially reduced or eliminated.

In one embodiment of the present invention, a method for generating correlation rules for events comprises receiving event data for each of a plurality of events, the event data of a particular event comprising at least one attribute associated with that event. The method continues by displaying the event data for each of the plurality of events to an operator. The method continues by receiving a selection of at least a portion of the events. The method continues by generating at least one rule that correlates the selected events based at least in part upon the attributes associated with the selected events. The method concludes by displaying the event data to the operator in accordance with the at least one rule.

In another embodiment of the present invention, a system for generating correlation rules for events comprises a sensor, an interface device, and a processor. The sensor receives event data for each of a plurality of events, the event data of a particular event comprising at least one attribute associated with that event. The interface device displays the event data for each of the plurality of events to an operator and receives a selection of at least a portion of the events. The processor generates at least one rule that correlates the selected events based at least in part upon the attributes associated with the selected events. The system displays the selected events to the operator in accordance with the at least one rule.

The invention has several important technical advantages. Various embodiments of the invention may have none, some, or all of these advantages. One advantage of the present invention is that it enables an operator to create new correlation rules "on the fly"—that is, while the operator is viewing event data in real time or nearly real time. The invention allows an operator to distill event data into rules without a technical understanding of the underlying rule structure. The operator does not need to understand the relationship between events in order to design a rule that correlates the events. In addition, the present invention integrates the event data interface and the rule design interface into a single interface, enabling the creation of new rules using real time or nearly real time event data. The invention also allows an operator to easily modify an existing rule. Finally, the present invention facilitates faster and more reliable rule design.

Other technical advantages of the present invention will be readily apparent to one skilled in the art from the description and the appended claims.

BRIEF DESCRIPTION OF THE DRAWINGS

For a more complete understanding of the present invention and its advantages, reference is now made to the following description, taken in conjunction with the accompanying drawings, in which:

FIG. 2 illustrates a flow of operation among various components of the system illustrated in FIG. 1;

DETAILED DESCRIPTION OF THE INVENTION

Figure 1:
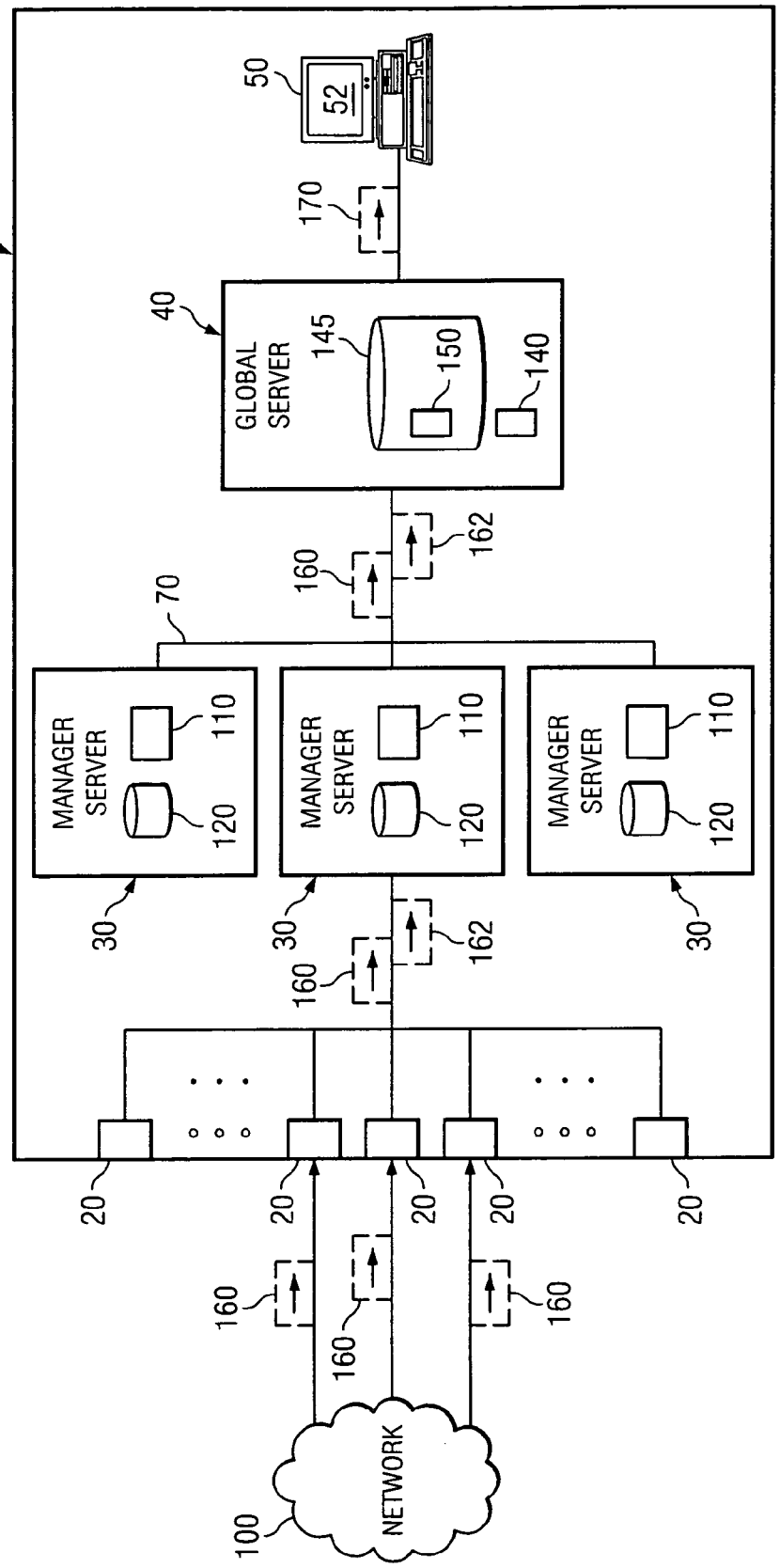
FIG. 1 illustrates an intrusion detection system according to one embodiment of the present invention.

FIG. 1 illustrates an intrusion detection system 10 distributed across an enterprise system according to one embodiment of the present invention. Intrusion detection system 10 comprises a plurality of sensors 20, one or more manager servers 30, global server 40, and console 50. These elements of system 10 may be communicatively coupled using an internal network 70. In general, system 10 performs data collection using sensors 20. The data is correlated by manager correlation engine 110 and/or global correlation engine 140 in accordance with rules designed to detect malicious activity. By allowing an operator (not shown) to design new rules using real time or nearly real time data, system 10 is able to detect patterns of malicious activity that may not otherwise have been detected. In addition, by allowing the operator to use selection/deselection techniques to create new rules, system 10 does not require the operator to have a technical understanding of the underlying rule structure. System 10 is therefore better equipped to detect and resolve attacks on the enterprise.

The "enterprise" may comprise any business, government, military, organization, or other entity that has multiple network channels or ports to a network 100. Network 100 may include any suitable portions of an external network and/or an internal network. In this regard, intrusion detection system 10 monitors network communications on both external and internal links. For example, an enterprise may include three ports for external network communications including email, internet, and dialup. In this example, intrusion detection system 10 monitors network communications on the three external ports. Based upon data received in these input streams, system 10 attempts to detect, locate, or block an attack on the enterprise. An "attack" may be any malicious, destructive, or suspicious activity communicated from a source external and/or internal to the portion of the enterprise protected by system 10. Attacks may include viruses, Trojan horses, worms, or any other piece of code or data that represents at least a portion of an unwanted attempt to access the protected portion of the enterprise.

Internal network 70 may include one or more intranets, local area networks (LANs), metropolitan area networks (MANs), wide area networks (WANs), or any other suitable enterprise network. Internal network 70 may, for example, communicate Internet Protocol (IP) packets, frame relay frames, Asynchronous Transfer Mode (ATM) cells, and/or other suitable messages between network addresses. According to particular embodiments, messages between the levels may be in one or more formats including Intrusion Detection Message Exchange Format (IDMEF), binary format, and/or other appropriate format.

Network 100 represents any network not protected by intrusion detection system 10. Accordingly, network 100 communicably couples system 10 with other computer systems. Network 100 may, for example, communicate Internet Protocol (IP) packets, frame relay frames, Asynchronous Transfer Mode (ATM) cells, and/or other suitable information between network addresses. Network 100 may include one or more intranets, local area networks (LANs), metropolitan area networks (MANs), wide area networks (WANs), all or a portion of the Internet, and/or any other communication system or systems at one or more locations. An external client system (not shown) may be any computer, enterprise or non-enterprise, which is trying to access the portion of internal network 70 protected by intrusion detection system 10. As used in this document, the term "computer" is intended to encompass a personal computer, server, mainframe, terminal, workstation, network computer, kiosk, wireless data port, wireless telephone, personal digital assistant (PDA), one or more processors within these or other devices, or any other suitable processing device.

Each sensor 20 is located at a network port that receives TCP/IP packets or other similar network communications from network 100. The packets or communications received at the network port are referred to as events. The data in the packets or communications detected by sensors 20 is referred to as event data 160. Generally, sensor 20 processes event data 160 to detect the presence of an attack. Sensor 20 outputs at least event data 160 and, when appropriate, a corresponding alert 162. An alert 162 is a message communicating the detection of an actual or potential attack. In certain embodiments, sensor 20 may also generate other messages based on the event data 160 received from network 100.

Sensor 20 may use any suitable detection technique to process event data 160 and generate the appropriate alerts 162. For example, sensor 20 may use algorithms, signatures, scripts, or any suitable detection or comparison technique to process packet headers, packet payloads, and/or any other incoming information. Sensor 20 could include any suitable combination of hardware, software, or firmware to receive event data 160 from sources via network 100, process event data 160, and communicate event data 160 and corresponding alerts 162 to higher levels. For example, sensor 20 may comprise a computer, server, lower-level intrusion detection system, firewall, or any module written in any appropriate computer language such as, for example, C, C++, Java, Perl, and others. It will be understood that while sensor 20 is illustrated as a single multi-tasked module, the features and functionality performed by this sensor 20 may be performed by multiple modules such as for example, a sensor module and a packet flow generation module. Additionally, to help ensure that each port is properly monitored, each sensor 20 may be associated with a redundant slave sensor which is operable to assume substantially all of the functionality of sensor 20 in the event of any failure of sensor 20.

Manager server 30 represents any hardware or software module that controls or monitors one or more servant nodes, such as sensor 20. In one example, each manager server 30 includes a manager correlation engine 110 and a manager ruleset 120 for processing communications from sensors 20. Generally, manager server 30 processes event data 160 and corresponding alerts 162 received from sensors 20 to detect the presence of an attack. In particular, manager server 30 is capable of detecting an attack spread among several sensors 20. Upon detecting an attack, manager server 30 may generate a corresponding alert 162. Manager server 30 outputs at least event data 160. When appropriate, manager server 30 may output alerts 162 generated by manager server 30 or alerts 162 received from sensors 20.

According to certain embodiments, manager server 30 may dynamically respond to an attack. Upon detecting an attack, manager server 30 may generate a command to protect system 10 from further malicious activity. For example, manager server 30 may disable the ports where the attack was detected or may restrict access to system 10.

According to certain embodiments, manager server 30 comprises a general-purpose personal computer (PC), a Macintosh, a workstation, a Unix-based computer, a server computer, or any suitable processing device. Additionally, to make system 10 more robust, each manager server 30 may be associated with a redundant manager server which is operable to assume substantially all of the functionality of manager server 30 in the event of a failure of the associated manager server 30. Although FIG. 1 provides one example of manager server 30 that may be used with the invention, system 10 can be implemented using computers other than servers, as well as a server pool. Manager server 30 may include any hardware, software, firmware, or combination thereof operable to receive communications from lower levels, appropriately process the communications, and dynamically respond.

Global server 40 represents any hardware, software, firmware, or combination thereof operable to process, control, and monitor system 10 at the highest logical level. Global server 40 may comprise a general-purpose personal computer (PC), a workstation, a Unix-based computer, a server computer, or any other suitable processing device. Generally, global server 40 processes event data 160 and alerts 162 received from manager servers 30 to detect the presence of an attack. In particular, global server 40 is capable of detecting an attack spread among several manager servers. Global server 40 outputs output data 170. Output data 170 comprises alerts generated by global server 40 and data resulting from correlation by global correlation engine 140 of event data 160 and alerts 162 received from manager servers 30. Output data 170 may also comprise uncorrelated, raw data from event data 160. Output data 170 is described in further detail below with respect to FIG. 2. Although FIG. 1 provides one example of global server 40 that may be used with the invention, system 10 can be implemented using computers other than servers, as well as a server pool.

According to certain embodiments, if global server 40 detects an attack, global server 40 may dynamically issue a response. For example, the response may be a command to disable the ports where the attack was detected or a command to restrict access to system 10.

Global server 40 comprises a global correlation engine 140. Global correlation engine 140 is operable to correlate event data 160 and alerts 162 to detect an attack occurring within the enterprise. Global correlation engine 140 is further operable to generate rules for correlating event data 160 and alerts 162 to detect malicious activity. Global correlation engine 140 may be any software or logic operable to process multiple communications from servant nodes and may use any suitable detection or comparison technique to process packet headers, packet payloads, and/or any other information. Global correlation engine 140 may be written in any appropriate computer language such as, for example, C, C++, Java, Perl, and others. It will be understood by those skilled in the art that global correlation engine 140 may reside locally in global server 40, remotely on another computer server, or distributed across servers. It will be further understood that while global correlation engine 140 is illustrated as a single module, the features and functionalities performed by this module may be performed by multiple modules.

In certain embodiments, global correlation engine 140 is communicatively connected to a memory module 145. Memory module 145 stores event data 160 for later processing, retrieval, or searches. Memory module 145 may include any memory or database module and may take the form of volatile or non-volatile memory comprising, without limitation, magnetic media, optical media, random access memory (RAM), read-only memory (ROM), removable media, or any other suitable local or remote memory component. Global correlation engine 140 is operable to process real time or nearly real time event data 160 and alerts 162. Global correlation engine 140 is further operable to process event data 160 and alerts 162 stored in memory module 145 to detect the presence of a substantially long-term or multi-staged attack that had previously gone undetected by sensors 20 and manager servers 30.

According to certain embodiments, memory module 145 comprises a global ruleset 150. Global ruleset 150 comprises instructions, algorithms, or any other directive that is used by global correlation engine 140 to process, correlate, aggregate, and/or filter event data 160 and alerts 162. In particular, based on global ruleset 150, global correlation engine 140 may correlate event data 160 and alerts 162 using any suitable criteria such as, for example, source IP address or destination IP address. Global correlation engine 140 may also aggregate event data 160 and alerts 162 for two or more events. Although FIG. 1 illustrates global ruleset 150 and memory module 145 as residing internally to global server 40, global ruleset 150 and memory module 145 may reside externally or at any other location or locations accessible by global server 40 or other components of system 10.

Console 50 represents any computer that may comprise input devices, output devices, mass storage media, processors, memory, or other components for receiving, processing, storing, and/or communicating information. Intrusion detection system 10 may communicate output data 170 to console 50 so that a user, such as an operator (not shown), may view and process the intrusion information. Console 50 may be, alternatively or additionally, linked to one or more manager servers 30 and/or global servers 40 without departing from the scope of this disclosure. It will be understood that there may be any number of consoles 50 used in system 10.

Console 50 may include a graphical user interface (GUI) 52 that tailors and filters the information presented to the user. Generally, GUI 52 provides the user of console 50 with an efficient and user-friendly presentation of output data 170. GUI 52 may open a secure shell (SSH) tunnel to provide additional secure communications between console 50 and the other portions of system 10. GUI 52 may comprise a plurality of displays having interactive fields, pull-down lists, and buttons operated by an operator. In one example, GUI 52 presents the most relevant portions of output data 170 to the operator (not shown) and conceals the remaining portions of output data 170 in order to reduce visual clutter. Then, upon receiving a request from the operator, GUI 52 expands the visual representation of output data 170 to display packet headers and payloads to the operator. GUI 52 may include multiple levels of abstraction including groupings and boundaries. It should be understood that the term graphical user interface may be used in the singular or in the plural to describe one or more graphical user interfaces and each of the displays of a particular graphical user interface.

FIG. 2 illustrates a flow of operation among various components of the present invention. Global server 40 receives event data 160 from manager servers 30. Event data 160 is the data that makes up the events detected by 20. Events are communications, packets, or messages received by sensors 20. An example of an event is a request for access to internal network 70 by an external client system (not shown). In this example, the request for access is the event. Each event comprises characteristics such as, for example, source IP address, destination IP address, time of the event, or type of machine generating the event. It will be understood that an event may have any number of characteristics. These characteristics are referred to as attributes.

In addition to event data 160, global server 40 may also receive alerts 162 generated by sensors 20 and manager servers 30. In the preceding example, if the request for access was an unauthorized request, sensor 20 may output a corresponding alert 162. Sensor 20 may output alert 162 as a message distinct from event data 160 for the request for access. In other embodiments, sensor 20 may combine event data 160 for the request for access with the corresponding alert 162 generated by sensor 20. In addition, certain events may be referred to as attacks. An attack is unauthorized or unwanted use or attempted use of an enterprise's computer network. In the preceding example, if the request for access to system 10 was unauthorized, then that event may be an attack. Global server 40 receives and processes event data 160 and alerts 162 in order detect and respond to attacks against the enterprise.

According to certain embodiments, global server 40 sends event data 160 and alerts 162 to global correlation engine 140. Global correlation engine 140 correlates event data 160 and alerts 162 in accordance with rules 152 stored in global ruleset 150. In particular, global correlation engine 140 processes event data 160 and alerts 162 according to the attributes of the events in event data 160. For example, a rule 152 may be to aggregate event data 160 for events with a source IP address having a first octet of 205. Based on this rule 152, global correlation engine 140 processes event data 160 by aggregating event data 160 for those events with a source IP address having a first octet of 205.

Global server 40 sends output data 170 to console 50. Output data 170 is the data that results once event data 160 is correlated, aggregated, grouped, or filtered by correlation engine 140. Output data 170 may also comprise uncorrelated, raw data from event data 160. Referring to the preceding example, the information in event data 160 for the events with a source IP address having a first octet of 205 may not be aggregated. In contrast, in output data 170, the information for the events with a source IP address having a first octet of 205 may be aggregated based on rule 152. Output data 170 may also comprise uncorrelated, raw data from event data 160. In addition, output data 170 may comprise alerts generated by global server 40 and alerts 162 received from manager servers 30.

Global server 40 transmits output data 170 to console 50. Graphical user interface (GUI) 52 displays output data 170 to operator 60. According to certain embodiments, GUI may display output data 170 as a list of events detected by sensors 20, the events grouped or correlated according to rules 152. Operator 60 may have knowledge, experience, or judgment that enables operator 60 to recognize suspicious information or patterns in output data 170 that were not detected by system 10. Alternatively or additionally, operator 60 may review output data 170 to verify that global server 40 is processing event data 160 appropriately. For example, global server 40 may be programmed to generate alerts for certain types of events in event data 160. Operator 60 may review output data 170 to verify that system 10 is actually generating alerts for those types of events.

In addition to viewing output data 170 displayed by GUI 52, operator 60 may use output data 170 to create a new rule 152a. A new rule 152a may be required as the security needs of the enterprise change. For example, an enterprise experiences a dramatic increase in the number of attacks from certain source IP addresses—specifically, from source IP addresses 205.252.48.164, 205.252.48.160, and 205.252.48.104. Accordingly, operator 60 wants to create new rule 152a to aggregate and generate an alert for events originating from those IP addresses. The present invention enables the creation of new rule 152a using real time or nearly real time output data 170. In particular, GUI 52 displays output data 170 to operator 60. Operator 60 reviews output data 170 displayed on GUI 52 and inputs into console 50 the events in output data 170 with IP addresses 205.252.48.164, 205.252.48.160, and 205.252.48.104. The selection of events is referred to as selection data 172. Selection data 172 indicates which events were selected and which events were not selected by operator 60. Console 50 transmits selection data 172 to global server 40. Selection data 172 will serve as the basis for new rule 152a.

Global correlation engine 140 processes selection data 172 and generates at least one new rule 152a based at least in part upon the attributes of the selected events in selection data 172. Global correlation engine 140 may use any suitable algorithms, mathematical formulas, or comparison techniques for generating rules based upon patterns in or common attributes of selection data 172. In one embodiment, new rule 152a is based upon one or more attributes that the selected events in selection data 172 have in common. In another embodiment, new rule 152a is based upon a pattern spread among the attributes of the selected events in selection data 172. In the present example, new rule 152a may be to aggregate and generate an alert for those events in event data 160 with a source IP address having 205.252 as the first two octets.

After new rule 152a is generated by global correlation engine 140, global server 40 stores new rule 152a in global ruleset 150. The selection data 172 used to generate new rule 152a is stored as new rule data 154a in global ruleset 150. New rule data 154a comprises output data 170 for the events selected by operator 60 in creating new rule 152a. GUI 52 re-displays output data 170 in accordance with new rule 152a. For example, GUI 52 displays together those events in output data 170 having 205.252 as the first two octets. According to new rule 152a, GUI 52 also displays an alert 162 corresponding to those events.

In certain embodiments, GUI 52 then requests operator 60 to input whether the displayed correlation is suitable. A correlation is suitable if the selected events are grouped as operator 60 intended. If operator 60 indicates that the correlation is suitable, GUI 52 displays the details of new rule 152a such as, for example, by displaying which attribute or attributes the selected events in selection data 172 have in common. In the present example, GUI 52 displays that the selected events in selection data 172 have the same first two octets in their source IP addresses—that is, the source IP addresses begin with 205.252. Operator 60 is thus informed of the basis of new rule 152a. Thereafter, as global server 40 receives additional event data 160, system 10 displays the additional event data 160 based at least in part on the new rule 152a.

If operator 60 inputs that the correlation in the preceding example is not acceptable, then GUI 52 requests operator 60 to select or deselect one or more additional events in output data 170. A correlation may not be acceptable if global correlation engine 140 generates a new rule 152a that is different from what operator 60 intended. In the preceding example, operator 60 selected those events in output data 170 with source IP addresses of 205.252.48.164, 205.252.48.160, and 205.252.48.104—the addresses associated with the dramatic increase in attacks. By coincidence, the selected events in selection data 172 may have another attribute in common. For example, the selected events in selection data 172 may have all occurred between 9:00 a.m. and 11:00 a.m. When correlation engine 140 processes selection data 172, correlation engine 140 may generate new rule 152a based upon time instead of source IP address—that is, the new rule 152a may be to aggregate and generate an alert for those events in event data 160 that occurred between 9:00 a.m. and 11:00 a.m. Such a new rule 152a may be unacceptable to operator 60. For example, if system 10 normally detects large volumes of event data between 9:00 a.m. and 11:00 a.m., new rule 152a may be too broad—that is, new rule 152a may aggregate numerous events that are unrelated to the addresses associated with the dramatic increase in attacks. Accordingly, operator 60 may input into console 50 that the correlation is unacceptable.

If operator 60 indicates that the correlation is unacceptable, GUI 52 requests operator 60 to select or deselect one or more additional events in output data 170. In this example, operator 60 may deselect those events in output data 170 that occurred between 9:00 a.m. and 11:00 a.m. and that do not have source IP addresses of 205.252.48.164, 205.252.48.160, and 205.252.48.104. Additionally or alternatively, operator 60 may select additional events in output data 170 that did not occur between 9:00 a.m. and 11:00 a.m. but that do have source IP addresses of 205.252.48.164, 205.252.48.160, and 205.252.48.104. The events in output data 170 selected or deselected by operator 60 are sent to global server 40 as selection data 172. Global correlation engine 140 processes selection data 172 and generates new rule 152a based upon the attributes of the selected events in selection data 172 as well as upon the attributes of the deselected events in selection data 172. In this example, new rule 152a may be to aggregate and generate an alert for those events in event data 160 with a source IP address having 205.252 as the first two octets.

Global server 40 stores in global ruleset 150 the new rule 152a. Selection data 172 used to generate new rule 152a is stored as new rule data 154a in global ruleset 150. GUI 52 re-displays output data 170 in accordance with new rule 152a by grouping those events in output data 170 having 205.252 as the first two octets. GUI also displays an alert corresponding to those events. GUI 52 requests operator 60 to input whether the displayed correlation is suitable. Because new rule 152a is now based upon certain source IP addresses rather than upon time, global correlation engine 140 is more likely to identify those events in event data 160 associated with the dramatic increase in attacks. Accordingly, operator 60 inputs that the correlation is acceptable. GUI 52 displays the details of new rule 152a such as, for example, by displaying that the selected events in selection data 172 have source IP addresses beginning with 205.252. Operator 60 is thus informed of the basis of new rule 152*a*. Thereafter, as global server 40 receives additional event data 160, system 10 displays the additional event data 160 based at least in part on the new rule 152*a*.

In addition to generating new rules 152*a*, the present invention may reveal to operator 60 patterns in or common attributes of event data 160 that were previously unknown to operator 60. For example, operator 60 notices a suspiciously high number of events in output data 170 that occurred between 3:00 a.m. and 4:00 a.m. Operator 60 therefore wants to create a new rule 152*a* to group and display all events in output data 170 occurring between 3:00 a.m. and 4:00 a.m. Of the several events in output data 170 displayed on GUI 52, operator 60 observes that the first, third, and tenth events occurred between 3:00 a.m. and 4:00 a.m. Consequently, operator 60 selects the first, third, and tenth events. Console 50 transmits selection data 172 identifying the first, third, and tenth events to global correlation engine 140. The selected events in selection data 172 comprise several attributes such as, for example, time, source IP address, destination IP address, and location of port being attacked. In the present example, unbeknownst to operator 60, the first, third, and tenth events have a common source IP address—205.252.48.164—in addition to the fact that these events all occurred between 3:00 a.m. and 4:00 a.m. Global correlation engine processes the selected events in selection information 172 and generates new rule 152*a*. In the present example, new rule 152*a* may be to group all events originating from IP address 205.252.48.164. Global server 40 stores new rule 152*a* in global ruleset 150. Global server 40 also stores as new rule data 154*a* the selection data 172 used to generate new rule 152*a*. GUI 52 re-displays output data 170, grouping the first, third, and tenth events in accordance with new rule 152*a*. Operator 60 inputs that the correlation is acceptable. GUI 52 then displays that new rule 152*a* is to group all events originating from source IP address 205.252.48.164. The fact that the first, third, and tenth events originated from the same IP address was unknown to operator 60 prior to creating new correlation rule 152*a*. Knowing that all three events originated from the same source IP address may enable operator 60 to better investigate and protect against a potential attack.

Notably, operator 60 is not required to know which attribute or attributes the selected events in selection data 172 have in common. In the foregoing example, operator 60 may simply have a hunch that the first, third, and tenth events are somehow related. Such a hunch may be based on the experience and understanding of operator 60 regarding attack characteristics and patterns. Even if operator 60 does not know how the selected events in selection data 172 are related, system 10 is operable to generate a rule 152*a* that correlates these events based upon a common attribute of these events or a pattern spread among these events. Operator 60 learns of the common attribute of and/or the pattern spread among the selected events in selection data 172 when system 10 displays the details of new rule 152*a*.

Once operator 60 has created a first new rule 152*a*, operator 60 may decide to create a second new rule 152*b*. In particular, second new rule 152*b* may expand upon or narrow first new rule 152*a*. Second new rule 152*b* may be needed due to the changing security needs of the enterprise. According to certain embodiments, while viewing output data 170, operator 60 may select certain events in output data 170 displayed on GUI 52. Console 50 transmits the selected events as selection data 172 to global server 40. Global correlation engine 140 processes selection data 172 and generates a second new rule 152*b* based at least in part upon the attributes associated with the selected events in selection data 172. The second new rule 152*b* is stored in global ruleset 150. The selection data 172 used to create second new rule 152*b* is stored in global ruleset 150 as second new rule data 154*b*. GUI 52 re-displays output data 170 according to second new rule 152*b* and requests operator 60 to input whether the correlation is suitable. If operator 60 indicates that it is suitable, GUI 52 displays the details of the correlation to operator 60.

According to certain embodiments, system 10 is operable to create a second new rule 152*b* that expands upon first new rule 152*a*. Referring to the prior example of the enterprise that experienced a dramatic increase in the number of attacks from certain source IP addresses (specifically, 205.252.48.164, 205.252.48.160, and 205.252.48.104), first new rule 152*a* is to aggregate and generate an alert for those events with a source IP address having 205.252 as the first two octets. In the present example, operator 60 later notices a high number of attacks from a fourth IP address—205.220.40.160. Based on experience and understanding of attack patterns, operator 60 suspects that the attacks from source IP address 205.220.40.160 are related to the attacks from source IP addresses 205.252.48.164, 205.252.48.160, and 205.252.48.104. Accordingly, operator 60 wants to create a second new rule 152*b* that expands first new rule 152*a* to include source IP address 205.220.40.160. Operator 60 inputs a request into console 50 to recall first new rule 152*a*. Graphical user interface (GUI) 52 displays first new rule 152*a*, first new rule data 154*a*, and real-time output data 170. To create new rule 152*b*, operator 60 selects events in output data 170 that originated from source IP address 205.220.40.160. Console 50 transmits the selected events as selection data 172 to global server 40. Global correlation engine 140 processes selection data 172 identifying the selected events and generates a second new rule 152*b*. According to certain embodiments, second new rule 152*b* may be based upon selection data 172 as well as first new rule 152*a* and first new rule data 154*a*. As stated above, first new rule 152*a* is to aggregate and generate an alert for those events with a source IP address beginning with 205.252. In the present example, the selected events in selection data 172 have source IP addresses of 205.220.40.160. The first octet of this source IP address matches the first octet required by first new rule 152*a*. The second octet of this source IP address, however, does not match the second octet required by first new rule 152*a*. Accordingly, global correlation engine 140 may generate a second new rule 152*b* to aggregate and generate an alert for those events in event data 160 with a source IP address having 205 as the first octet.

Global server 40 stores in global ruleset 150 second new rule 152*b*. Selection data 172 used to create second new rule 152*b* is stored in global ruleset 150 as second new rule data 154*b*. GUI 52 re-displays output data 170 in accordance with second new rule 152*b*. For example, GUI 52 displays as one group those events having 205 as the first octet. GUI also displays an alert corresponding to those events and requests operator 60 to input whether the displayed correlation is suitable. A correlation is suitable if the selected events are grouped as operator 60 intended. If operator 60 indicates that the correlation is suitable, GUI 52 displays the details of new rule 152*b* such as, for example, by displaying which attribute or attributes the selected events in selection data 172 and first new rule data 154*a* have in common. In the present example, GUI 52 displays that the selected events in selection data 172 and first new rule data 154*a* were correlated according to the first octet of their source IP addresses—205. Thereafter, as global server 40 receives additional event data 160, global server 40 processes the additional event data 160 based at least in part on second new rule 152*b*.

In the preceding example, second new rule 152*b* expands upon first new rule 152*a*. System 10 may also create a second new rule 152*b* that narrows first new rule 152*a*. Referring to the example of the enterprise that experienced a dramatic increase in the number of attacks from certain source IP addresses (specifically, 205.252.48.164, 205.252.48.160, and 205.252.48.104), first new rule 152*a* is to aggregate and generate an alert for those events with a source IP address having 205.252 as the first two octets. Operator 60 later notices that 12 of the events having source IP addresses beginning with 205.252 occurred between 3:00 a.m. and 3:15 a.m. Suspecting that these 12 events are related, operator 60 wants to create a second new rule 152*b* to aggregate and generate an alert for the events occurring between 3:00 a.m. and 3:15 a.m. and having a source IP address beginning with 205.252. Operator 60 inputs into console 50 a request to recall first new rule 152*a*. GUI 52 displays first new rule 152*a*, first new rule data 154*a*, and real time output data 170. Operator 60 deselects the events displayed on GUI 52 that did not occur between 3:00 a.m. and 3:15 a.m. Console 50 sends the deselected events to global server 40 as selection data 172. Global correlation engine 140 processes selection data 172 and generates second new rule 152*a* to aggregate and generate an alert for only those events occurring between 3:00 a.m. and 3:15 a.m. and originating from a source IP address having 205.252 as the first two octets.

Global server 40 stores in global ruleset 150 second new rule 152*b*. Selection data 172 used to create second new rule 152*b* is stored in global ruleset 150 as second new rule data 154*b*. GUI 52 re-displays output data 170 in accordance with second new rule 152*b*. For example, GUI 52 displays as one group those events having 205.252 as the first two octets and occurring between 3:00 a.m. and 3:15 a.m. GUI also displays an alert corresponding to those events and requests operator 60 to input whether the displayed correlation is suitable. If operator 60 indicates that the correlation is suitable, GUI 52 displays the details of second new rule 152*b*. In the present example, GUI 52 displays that the selected events of first new rule data 154*a* and the events that were not deselected in selection data 172 were correlated according to the first two octets of their source IP addresses and according to time. Thereafter, as global server 40 receives additional event data 160, global server 40 processes the additional event data 160 based at least in part on second new rule 152*b*. Thus, in this example, system 10 generates second new rule 152*b* that narrows first new rule 152*a*.

Global correlation engine 140 may use any suitable algorithms, mathematical formulas, or comparison techniques for generating correlation rules 152 based upon patterns in or common attributes of selection data 172. According to certain embodiments, global correlation engine 140 compares the attributes of the selected events in selection data 172 and generates new rule 152 based upon all of the common attributes and patterns of selection data 172. In some embodiments, global correlation engine 140 compares the attributes of the selected events in selection data 172 and generates new rule 152 based upon one only one common attribute or pattern of selection data 172. To generate new rule 152, global correlation engine 140 may be configured to perform different types of comparisons of the attributes of the selected events in selection data 172. According to certain embodiments, in comparing attributes in selection data 172, global correlation engine 140 may be configured to identify exact matches of attributes in selection data 172. In other embodiments, in comparing attributes in selection data 172, global correlation engine 140 may be configured to identify attributes in selection data 172 that are within a certain range of each other.

The present invention may be implemented in various enterprise computer networks. In particular, system 10 may be a military information system. At least a portion of alerts 162 may be alerts generated in the military information system. Event data 160 and alerts 162 may be correlated by global correlation engine 140 to detect harmful conditions internal and/or external to system 10. The present invention allows operator 60 of a military information system to use real time or nearly real time data to create new correlation rules 152. For example, system 10—a military information system—detects that combat units A, B, and C are out of supplies. Sensors 20 generate three separate alerts 162—one for each unit. Operator 60, a supply officer, realizes that units A, B, and C make up battalion D. Operator 60 may want to simplify the presentation of information on GUI 52 by aggregating certain events and alerts. Accordingly, operator 60 may decide to create new rule 152*a* to aggregate the separate alerts 162 for units A, B, and C into a single supply level alert 162 for battalion D. According to certain embodiments, operator 60 selects the three separate alerts 162 for units A, B, and C in output data 170. Console 50 sends the selected alerts 162 as selection data 172 to global server 40. Global correlation engine 140 processes selection data 172 and generates new rule 152*a*. New rule 152*a* may be to combine alerts 162 for units A, B, and C into a single alert 162 for battalion D. New rule 152*a* is stored in global ruleset 150. Selection data 172 used to create new rule 152*a* is stored in global ruleset 150 as new rule data 154*a*. GUI 52 re-displays output data 170 to operator 60 in accordance with new rule 152*a*. For example, GUI 52 displays a single supply level alert 162 for battalion D instead of three separate alerts 162 for individual units A, B, and C. GUI 52 requests operator 60 to input whether the correlation is suitable. If operator 60 inputs that the correlation is suitable, GUI 52 displays the details of the correlation to operator 60. For example, GUI 52 displays that new rule 152*a* is to combine alerts 162 for units A, B, and C. As system 10 receives additional event data 160, global correlation engine 140 processes and displays event data 160 in accordance with new rule 152*a*.

As illustrated by the preceding examples, the present invention has several important technical advantages. Various embodiments of the invention may have none, some, or all of these advantages. According to certain embodiments, one advantage is that the present invention enables operator 60 to create new correlation rules 152 "on the fly"—that is, while operator 60 is viewing output data 170 in real time or nearly real time. According to certain embodiments, the present invention allows operator 60 to distill output data 170 into correlation rules 152 without a technical understanding of the underlying structure of the correlation rules 152. In some embodiments, operator 60 does not need to understand the relationship between selected events in selection data 172 in order to design a rule 152 that correlates the selected events in selection data 172. In addition, according to certain embodiments, the present invention allows operator 60 to easily create a second new rule 152*b* that modifies first new rule 152*a*. Finally, according to certain embodiments, the present invention facilitates faster and more reliable design of rules 152.

According to certain embodiments, global correlation engine 140, global ruleset 150, and memory module 145 may be positioned in any node of system 10. Therefore, although FIG. 2 illustrates communication between console 50 and global server 40, console 50 may communicate with a manager server 30, sensor 20, or other node to perform the functionality described above. Furthermore, according to certain embodiments, a manager server 30 may be operable to perform the functionality of global server 40 as described above.

Figure 3A:
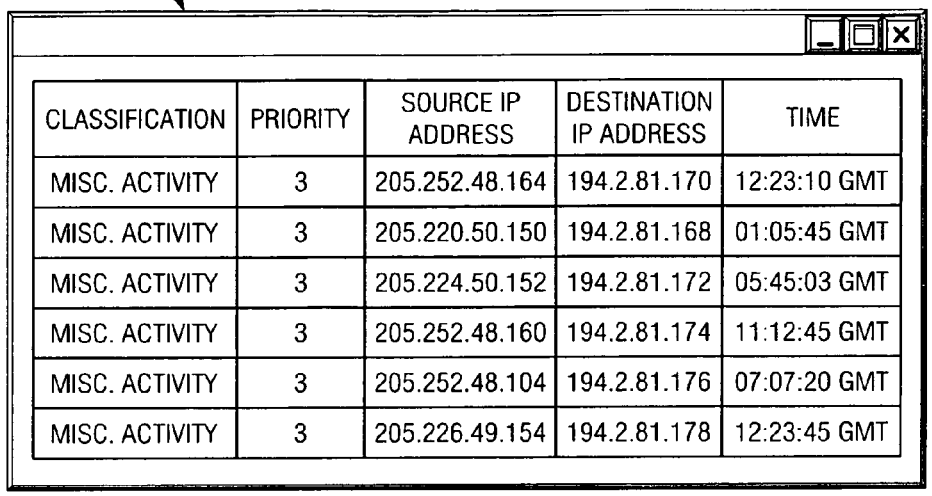
FIG. 3A illustrates a display of output data according to one embodiment of the present invention.

FIG. 3A illustrates a display of output data 170 according to one embodiment of the present invention. Output data 170 is the data that results once event data 160 is correlated, aggregated, grouped, or filtered by correlation engine 140. Output data 170 may also comprise uncorrelated, raw data from event data 160. In addition, output data 170 may also comprise alerts 162 generated by global server 40 and alerts 162 received from manager servers 30. According to certain embodiments, console 50 receives output data 170 from global server 40. Console 50 displays output data 170 on GUI 52 to operator 60. GUI 52 may display output data 170 for several events simultaneously. For example, in the embodiment illustrated in FIG. 3A, GUI 52 may display output data 170 for six different events detected by sensors 20. Each event comprises several attributes such as, for example, classification of event, priority of event, source IP address of event, destination IP address of event, and time of event. An event in output data 170 may comprise one or more of these attributes and/or any number of additional attributes. None, some, or all of the attributes of a particular event in output data 170 may be displayed by GUI 52.

The present invention allows operator 60 to create new rules 152 using real time or nearly real time output data 170 displayed on GUI 52. Operator 60 may want to create new rules 152 in order protect internal network 70 against new types of threats. Referring to the example of the enterprise that experienced a dramatic increase in the number of attacks, operator 60 may notice a high number of attacks from source IP addresses 205.252.48.164, 205.252.48.160, and 205.252.48.104. Accordingly, operator 60 may want to create new rule 152*a* to aggregate and generate an alert for events in event data 160 originating from these IP addresses. Referring to the example illustrated in FIG. 3A, by viewing output data 170 on GUI 52, operator 60 may observe that the first, fourth, and fifth events have source IP addresses of 205.252.48.164, 205.252.48.160, and 205.252.48.104, respectively. Accordingly, operator 60 may input into console 50 a selection of the first, fourth, and fifth events displayed by GUI 52. Console 50 transmits the selected events as selection data 172 to global server 40. Global correlation engine 140 processes selection data 172 and generates new rule 152*a* based at least in part upon the attributes of the selected events in selection data 172. In one embodiment, new rule 152*a* is based upon one or more attributes that the selected events in selection data 172 have in common. In the present example, new rule 152*a* may be to aggregate and generate an alert for those events in event data 160 with a source IP address having 205.252 as the first two octets. Global server 40 stores in global ruleset 150 new rule 152*a*. The selection data 172 used to generate new rule 152*a* is stored as new rule data 154*a* in global ruleset 150. GUI 52 then re-displays output data 170 in accordance with new rule 152*a*.

Figure 3B:
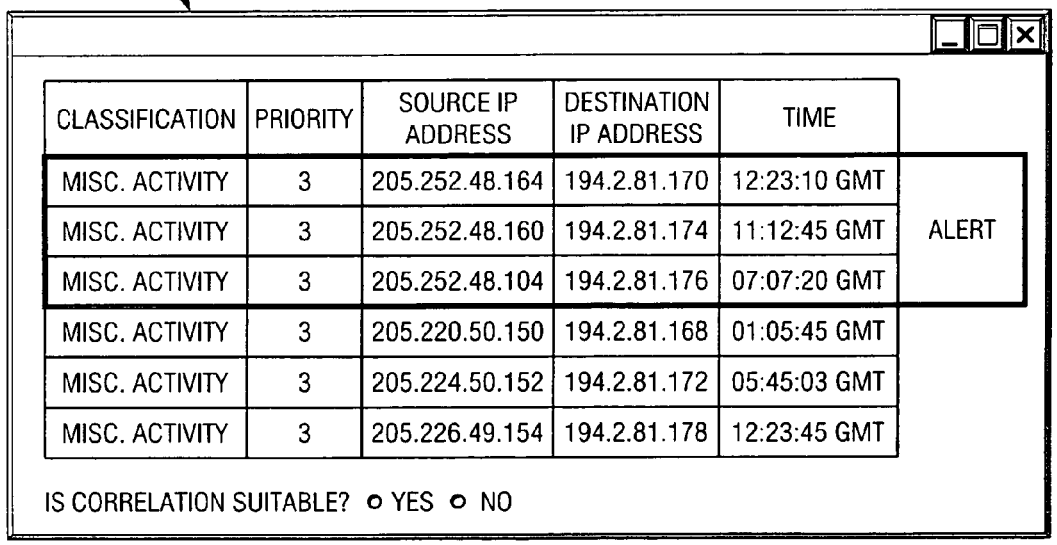
FIG. 3B illustrates a display of output data according to one embodiment of the present invention.

FIG. 3B illustrates one embodiment for a display of output data 170 in accordance with new rule 152*a*. New rule 152*a* is to aggregate and generate an alert for those events in event data 160 with a source IP address beginning with 205.252. Output data 170 depicted in FIG. 3A is re-displayed by GUI 52 in FIG. 3B according to new rule 152*a*. The events in output data 170 with source IP addresses beginning with 205.252 are grouped together. In addition, GUI 52 displays an alert in association with these events and requests operator 60 to input whether the correlation is suitable. If operator 60 indicates that the correlation is suitable, GUI 52 displays the details of new rule 152*a* such as, for example, by displaying which attribute or attributes the selected events in selection data 172 have in common. Thereafter, as global server 40 receives additional event data 160, system 10 displays the additional event data 160 based at least in part on new rule 152*a*.

Figure 4:
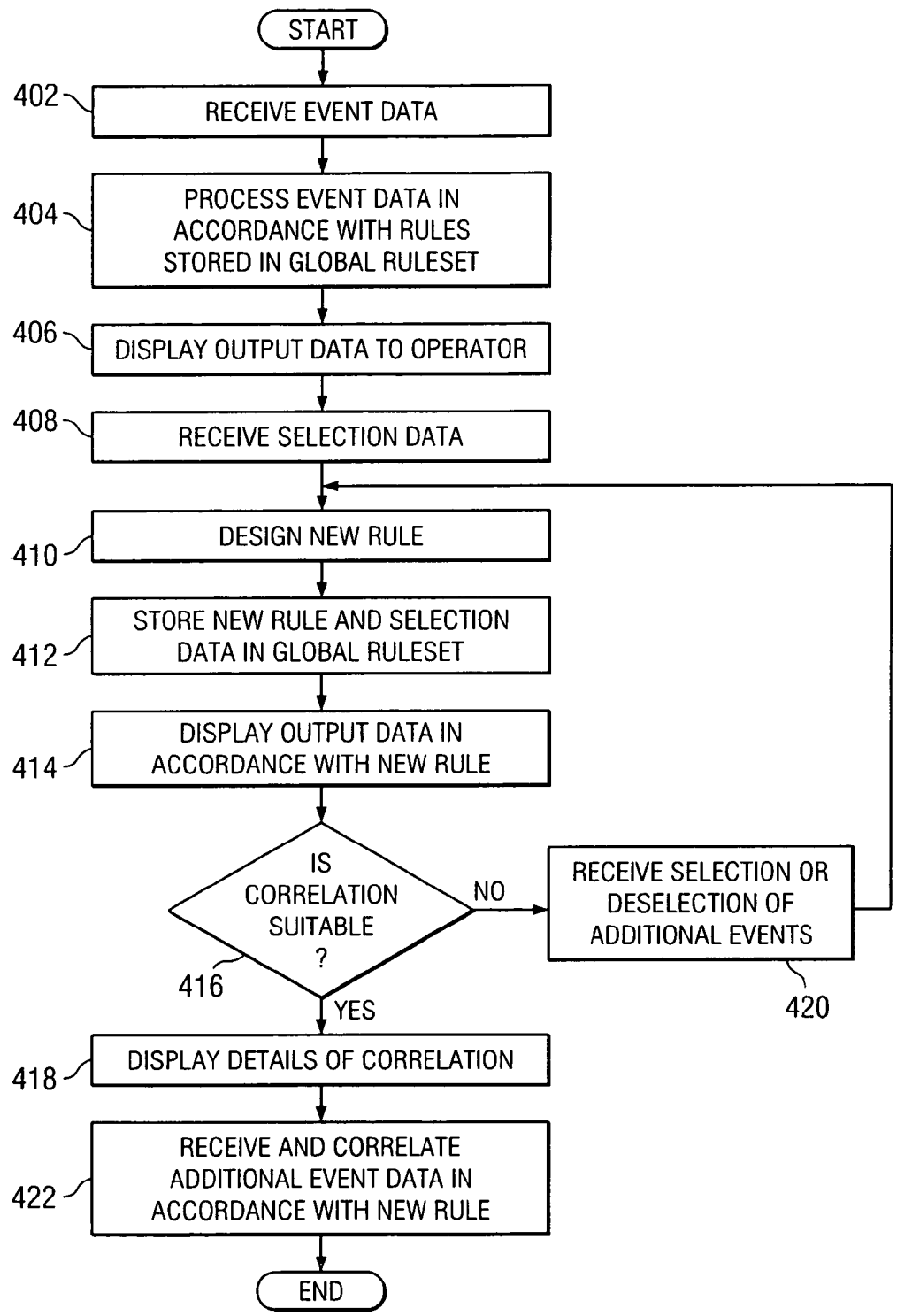
FIG. 4 illustrates a flowchart according to one embodiment of the present invention.

FIG. 4 represents a flowchart of the method of the present invention. Global server 40 receives event data 160 from sensors 20 and/or manager servers 30 in step 402. Event data 160 comprises information about events detected by sensors 20. At step 404, global correlation engine 140 processes event data 160 in accordance with rules 152 stored in global ruleset 150. Global correlation engine 140 outputs output data 170, which comprises alerts generated by global server 40 and data resulting from correlation by global correlation engine 140 of event data 160 and alerts 162 received from manager servers 30. Output data 170 may also comprise uncorrelated, raw data from event data 160. GUI 52 displays output data 170 to operator 60 in step 406. At step 408, operator 60 inputs into console 50 a selection of one or more events in output data 170 to serve as the basis for new rule 152*a*. The selected events are sent to global server 40 as selection data 172. At step 410, global correlation engine 140 receives selection data 172 and designs new rule 152*a* based at least in part upon one or more attributes of the selected events in selection data 172. At step 412, global server 40 stores new rule 152*a* in global ruleset 150. Selection data 172 used to generate new rule 152*a* is stored as new rule data 154*a* in global ruleset 150. At step 414, GUI 52 displays output data 170 in accordance with new rule 152*a* and requests operator 60 to input whether the correlation is suitable. A correlation is suitable if the selected events in selection data 172 are correlated as operator 60 intended. At decisional step 416, operator 60 determines whether the correlation is suitable. At step 418, if operator 60 inputs that the correlation is suitable, GUI 52 displays the details of the correlation such as, for example, by displaying the attributes that selected events in selection data 172 have in common. At step 422, global server 40 receives additional event data 160 and correlates the additional event data 160 in accordance with new rule 152*a*. If operator 60 determines at step 416 that the correlation is not suitable, then, at step 420, GUI 52 requests operator 60 to select or deselect additional events in output data 170. In particular, operator 60 selects or deselects those events in output data 170 that operator 60 believes should not be correlated with the other selected events in selection data 172. The method then returns to step 410, where correlation engine 140 generates new rule 152*a* based upon the selection or deselection of additional events by operator 60.

Although the present invention has been described in detail, it should be understood that various changes, substitutions and alterations can be made hereto without departing from the scope of the invention as defined by the appended claims.

What is claimed is:

1. A method for generating correlation rules for events, comprising:

receiving event data for each of a plurality of events, the event data of a particular event comprising at least one attribute associated with that event;

displaying the event data for each of the plurality of events to an operator, the event data for the plurality of events having been processed according to one or more rules of a ruleset stored in a memory, the event data being displayed in a unified interface for displaying event data processed by rules in the ruleset and for creation of new correlation rules;

receiving a selection made using the unified user interface of at least a portion of the plurality of events for which event data is displayed to the operator in the unified user interface;

generating at least one new rule that correlates the selected events, the at least one new rule generated based at least in part upon a pattern spread among the attributes associated with the selected events, the at least one new rule generated by at least one processor;

storing the at least one new rule and the selection of at least a portion of the events in the memory such that the at least one new rule is added to the ruleset stored in the memory; and re-displaying, in the unified interface for displaying event data processed by rules in the ruleset and for creation of new correlation rules, the event data to the operator such that the event data is correlated in accordance with the at least one new rule.

2. The method of claim 1, wherein:

the event data is received by one or more sensors; and at least a portion of the events comprise alerts generated in an intrusion detection system.

3. The method of claim 1, wherein at least a portion of the events comprise alerts generated in a military information system.

4. The method of claim 1, wherein the selection is made by the operator in response to the display of event data.

5. The method of claim 1, wherein:

the plurality of events comprises a first event, a second event, and a third event;

the selection comprises a selection of the first event and the third event; and the at least one processor generates the at least one new rule by at least identifying one or more attributes associated with the first event that are in common with one or more attributes associated with the third event.

6. The method of claim 1, wherein the at least one new rule comprises a first new rule, and further comprising:

receiving a selection of additional events made by the operator; and generating a second new rule that correlates the initially selected events and the additionally selected events based at least in part upon the attributes associated with these events.

7. The method of claim 6, wherein generating the second new rule comprises modifying the first new rule.

8. The method of claim 1, wherein the at least one new rule comprises a first new rule, and further comprising:

receiving a deselection of events made by the operator; and generating a second new rule that correlates the initially selected events but not the deselected events based at least in part upon the attributes associated with these events.

9. The method of claim 1, wherein the at least one new rule is a first new rule and further comprising:

requesting the operator to indicate whether the correlation of the event data in accordance with the first new rule is acceptable; and if the correlation is indicated to be unacceptable:

requesting the operator to deselect at least one of the plurality of events; and generating a second new rule based at least in part on the at least one deselected event.

10. A system for generating correlation rules for events, comprising:

at least one sensor that receives event data for each of a plurality of events, the event data of a particular event comprising at least one attribute associated with that event;

at least one memory that stores a ruleset comprising a plurality of rules;

at least one interface device that displays the event data for each of the plurality of events to an operator, the event data for the plurality of events having been processed according to one or more rules of the ruleset, and that receives a selection of at least a portion of the plurality of events for which event data is displayed to the operator, the interface comprising a unified interface for displaying event data processed by rules in the ruleset and for creation of new correlation rules, the event data for each of the plurality of events being displayed to the operator using the unified user interface and the at least one selection being made using the unified user interface; and at least one processor that generates at least one new rule that correlates the selected events, the at least one new rule generated based at least in part upon a pattern spread among the attributes associated with the selected events, stores the at least one new rule and the selection of at least a portion of the events in the at least one memory such that the at least one new rule is added to the ruleset stored in the at least one memory, and redisplays, in the unified user interface for displaying event data processed by rules in the ruleset and for creation of new correlation rules, the selected events to the operator such that the event data is correlated in accordance with the at least one new rule.

11. The system of claim 10, wherein the correlation is based on more than one type of attribute.

12. The system of claim 10, wherein:

the at least one new rule is a first new rule;

the at least one interface device requests the operator to indicate whether the correlation of the event data in accordance with the first new rule is acceptable; and if the correlation is indicated to be unacceptable:

the at least one interface device requests the operator to deselect at least one of the plurality of events; and the at least one processor generates a second new rule based at least in part on the at least one deselected event.

13. The system of claim 10, wherein at least a portion of the events comprise alerts generated in an intrusion detection system.

14. The system of claim 10, wherein at least a portion of the events comprise alerts generated in a military information system.

15. The system of claim 10, wherein the selection is made by the operator in response to the display of event data.

16. The system of claim 10, wherein:

the plurality of events comprises a first event, a second event, and a third event;

the selection comprises a selection of the first event and the third event; and the at least one processor generates the at least one new rule by at least identifying one or more attributes associated with the first event that are in common with one or more attributes associated with the third event.

17. The system of claim 10, wherein:

the at least one new rule comprises a first rule;

the processor receives a selection of additional events made by the operator; and the processor generates a second new rule that correlates the initially selected events and the additionally selected events based at least in part upon the attributes associated with these events.

18. The system of claim 17, wherein the processor generates a second new rule by modifying the first new rule.

19. The system of claim 10, wherein:
the at least one new rule comprises a first new rule;
the processor receives a deselection of events made by the operator; and
the processor generates a second new rule that correlates the initially selected events but not the deselected events based at least in part upon the attributes associated with these events.

20. The system of claim 19, wherein the processor generates a second new rule by modifying the first new rule.

21. An apparatus for generating correlation rules for events, the apparatus comprising:
at least one memory that stores a ruleset comprising a plurality of rules; and
a correlation engine that:
receives event data for each of a plurality of events, the event data of a particular event comprising a plurality of attributes associated with that event;
displays the event data for each of the plurality of events to at least one operator, the event data for the plurality of events having been processed according to one or more rules of the ruleset, the event data being displayed in a unified interface for displaying event data processed by rules in the ruleset and for creation of new correlation rules;
receives from the at least one operator a selection made using the unified user interface of at least a portion of the plurality of events for which event data is displayed to the at least one operator in the unified user interface;
generates at least one new rule that correlates the selected events, the at least one new rule generated based at least in part upon a pattern spread among the attributes associated with the selected events;
stores the at least one new rule and the selection of at least a portion of the events in the at least one memory such that the at least one new rule is added to the ruleset stored in the at least one memory; and
sends the event data to at least one graphical user interface in accordance with the at least one new rule such that the selected events are redisplayed, in the unified interface for displaying event data processed by rules in the ruleset and for creation of new correlation rules, to the at least one operator in such a way that the selected event data is correlated in accordance with the at least one new rule.

22. The apparatus of claim 21, wherein at least a portion of the events comprise alerts generated in an intrusion detection system.

23. The apparatus of claim 21, wherein at least a portion of the events comprise alerts generated in a military information system.

24. The apparatus of claim 21, wherein:
the plurality of events comprises a first event, a second event, and a third event;
the selection comprises a selection of the first event and the third event; and
the correlation engine generates the at least one new rule by at least identifying one or more attributes associated with the first event that are in common with one or more attributes associated with the third event.

25. The apparatus of claim 21, wherein the at least one new rule comprises a first new rule, and the correlation engine:
receives a selection of additional events made by the operator; and
generates a second new rule that correlates the initially selected events and the additionally selected events based at least in part upon the attributes associated with these events.

26. The apparatus of claim 25, wherein the correlation engine generates the second new rule by modifying the first new rule.

27. The apparatus of claim 21, wherein the at least one new rule comprises a first new rule, and the correlation engine:
receives a deselection of events made by the operator; and
generates a second new rule that correlates the initially selected events but not the deselected events based at least in part upon the attributes associated with these events.

28. The apparatus of claim 27, wherein the correlation engine generates the second new rule by modifying the first new rule.

29. The apparatus of claim 21, wherein:
at least one of the plurality of events is a data packet received at a network port, the at least one event associated with an attack; and
in conjunction with detecting the attack, the correlation engine disables the network port.

30. The apparatus of claim 21, wherein:
the at least one new rule is a first new rule; and
the correlation engine generates a second new rule based at least in part on the selection stored in the memory.

31. The apparatus of claim 21, wherein the plurality of attributes for each event comprises a source IP address, a destination IP address, a time, and a priority value.

32. The apparatus of claim 21, wherein:
the correlation engine detects that the pattern spread among the attributes associated with the selected events is a particular IP address that is common among the selected events; and
in response to detecting the pattern, the correlation engine designs the at least one new rule to generate one or more alerts for events associated with the particular IP address.

33. The apparatus of claim 21, wherein:
the correlation engine detects that the pattern spread among the attributes associated with the selected events is based at least in part on times associated with the selected events; and
in response to detecting the pattern, the correlation engine designs the at least one new rule to generate one or more alerts for events occurring between a first time and a second time.

* * * * *